UNITED STATES PATENT OFFICE.

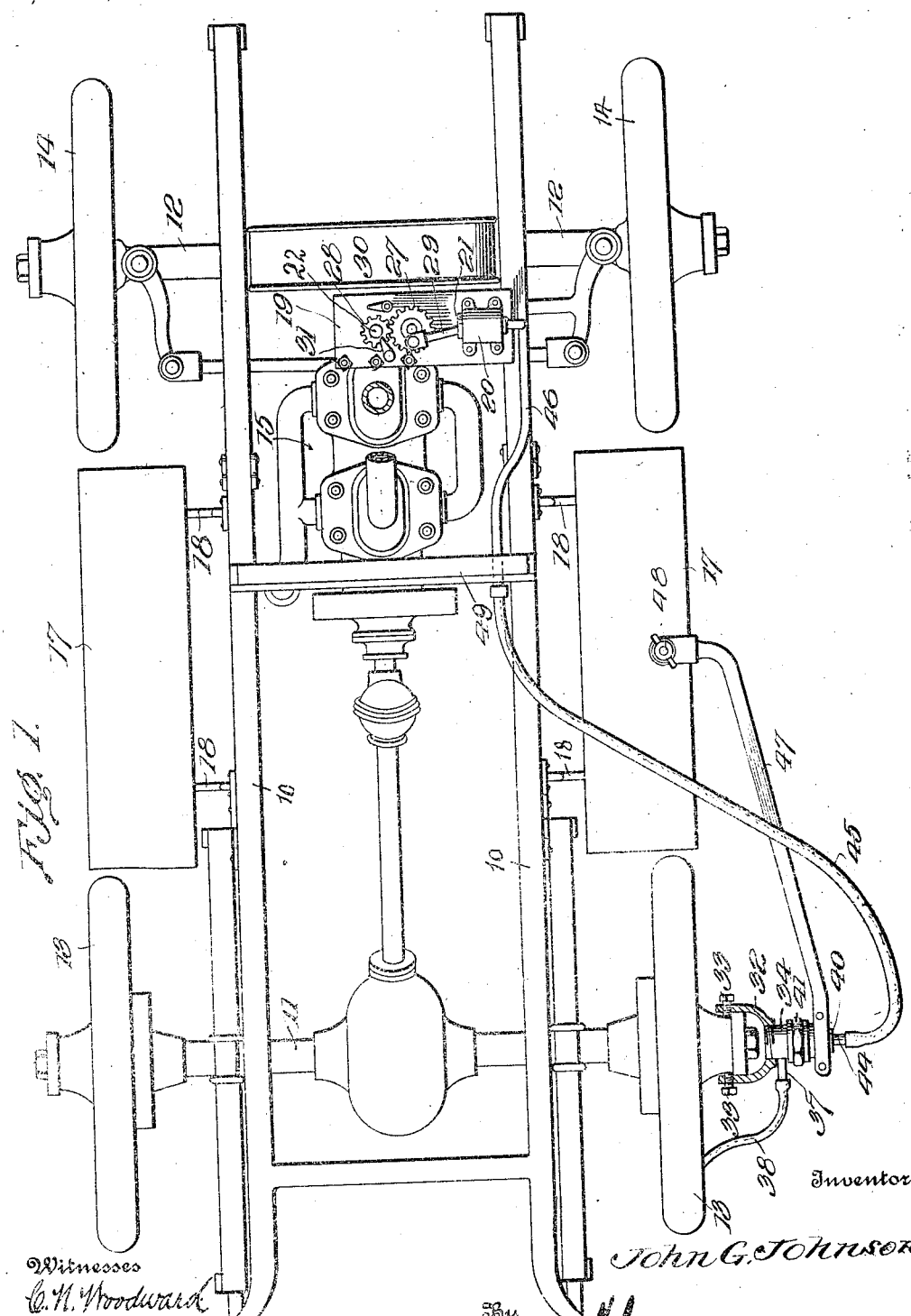

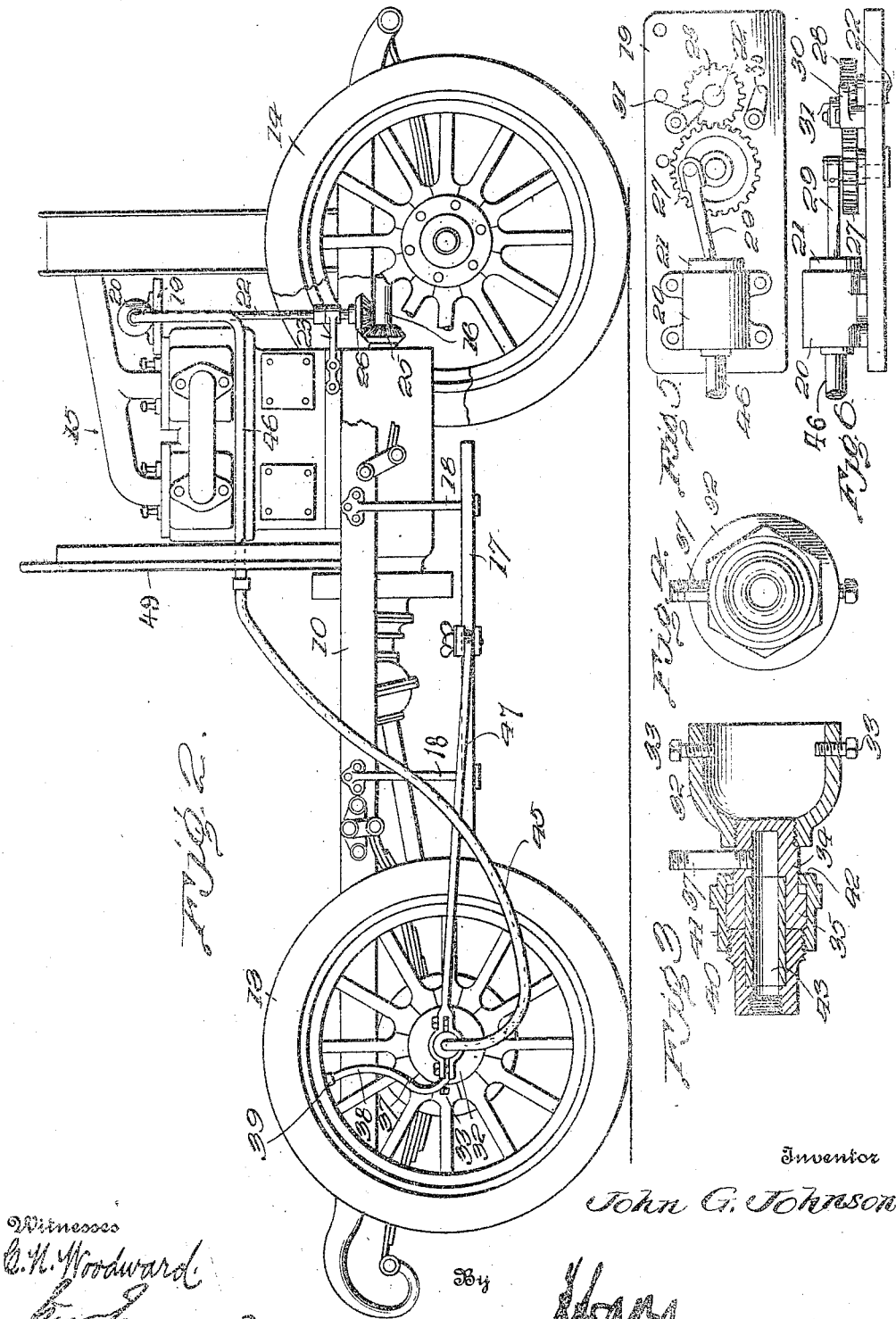

JOHN G. JOHNSON, OF TACOMA, WASHINGTON.

MOTOR-DRIVEN TIRE-PUMP.

1,173,434. Specification of Letters Patent. Patented Feb. 29, 1916.

Application filed February 15, 1915. Serial No. 8,341.

*To all whom it may concern:*

Be it known that I, JOHN G. JOHNSON, a citizen of the United States, residing at Tacoma, in the county of Pierce and State of Washington, have invented certain new and useful Improvements in Motor-Driven Tire-Pumps, of which the following is a specification.

This invention relates to improvements in the air supplying devices for the pneumatic tires of automobiles and like vehicles, and has for one of its objects to provide a simply constructed device adapted to be attached to the hub of the wheel and to the air valve of the tire and operative, either when the vehicle is at rest or in motion.

Another object of the invention is to provide a simply constructed device which may be applied without material modification to automobiles and like vehicles of various forms and sizes.

With these and other objects in view, the invention consists in certain novel features of construction as hereinafter shown and described and then specifically pointed out in the claims; and in the drawings illustrative of the preferred embodiment of the invention, Figure 1 is a plan view of the framework, traction wheels and engine portion of an automobile of conventional construction with the improvement applied. Fig. 2 is a side elevation of the parts of the device as shown in Fig. 1 and partly in section. Fig. 3 is an enlarged sectional view of the coupling device; Fig. 4 is an end view of the parts shown in Fig. 3. Fig. 5 is an enlarged plan view of the air pump device; Fig. 6 is a side view of the parts shown in Fig. 5.

Corresponding and like parts are referred to in the following description and indicated in all the views of the drawings by the same reference characters.

The improved device may be applied without material structural change to automobiles of various forms and makes, but for the purpose of illustration is shown applied to a conventional vehicle of this character, and in the drawings the framework of the automobile is represented conventionally at 10, the rear axle at 11, the forward axle at 12, the rear traction wheels at 13, the forward traction wheels at 14, the engine at 15 and the cranking shaft at 16. The running or foot boards are indicated at 17 and supported from the frame 10 by brackets 18 in the usual manner.

The improved device includes a cap 32 arranged to engage over the hub of the wheel whose tire is to be inflated, the cap having set screws 33 or other suitable devices, whereby the cap may be coupled to the hub and rotate therewith. Extending from the cap 32, is a hollow inner body 34 enlarged at its outer end, as shown at 35. Extending from the body 34 is a relatively small branch 37 to the outer end of which a flexible air conductor tube 38 is connected at one end and adapted to be connected at the other end to the valve of a pneumatic tire, indicated at 39. Engaging against the outer end of the enlarged terminal 35 of the body 34, is an outer hollow body 40, externally threaded to receive a coupling collar or sleeve 41, the sleeve having an inwardly directed inner flange 42 to engage against the inner end of the enlargement 35. By this means, the members 34—40 are coupled and the member 32—34 left free to rotate within the coupling member 41. The bore of the member 34 and the bore of the member 40 are enlarged to form sockets having terminal stop shoulders and receive a supporting sleeve 43 which assists in supporting the members 32—34 in their rotary movement relative to the members 40—41. Fitting in the outer end of the member 40 is a conductor tube 44 from which a flexible conductor member 45 leads, the latter being connected at the other end to a branch 46 connected in turn to the air pumping mechanism.

The branch 46 leads through the rear member 49 of the engine housing with its terminal in convenient position to receive the conductor 45. The pumping action may be accomplished whether the automobile is at rest with the axle of the wheel to which the coupling mechanism is attached elevated from the ground, or while the automobile is running over the road, as may be preferred.

If required, one of the members 32 and its connections may be attached to each of the traction wheel hubs and suitable hose connections permanently connected therewith, or one of the devices only may be employed and applied to the wheel which is to be inflated, when required.

The improved device is simple in construction, can be inexpensively manufactured and applied and operates effectually for the purpose described.

Some means, such as a brace 47, will be employed to hold the member 40 from turning and coupled at 48 to the adjacent foot board 17, as shown. The conductor member 45 will preferably be of sufficient length to enable the cap 32 and its attachments to be applied to the hub of any of the wheels, so that one single pump and one single coupling device may be employed for all the wheels.

Having thus described the invention, what is claimed as new is:

1. In a device of the class described, a hollow inner body adapted to be coupled to a wheel hub and having a lateral discharge an external annular bearing and an internal socket terminating in a stop shoulder, an outer tubular body adapted to receive an air supply externally threaded and provided with an internal socket terminating in a stop shoulder, a tubular supporting member seated in said sockets and against said stop shoulders, and a sleeve bearing around the confronting ends of said bodies and internally threaded to engage the threads of the outer body and provided with an inwardly directed flange to engage the bearing of the inner body.

2. In a device of the class described, a hollow inner body adapted to be coupled to a wheel hub and having a lateral discharge an external annular bearing and an internal socket terminating in a stop shoulder, an outer tubular body adapted to receive an air supply and provided with an external bearing, said outer tubular body being externally threaded and provided with an internal socket terminating in a stop shoulder, a tubular supporting member seated in said sockets and against said stop shoulder, a sleeve bearing around the confronting ends of said bodies and internally threaded to engage the threads of the outer body and provided with an inwardly directed flange to engage the bearing of the inner body, and a brace having clamping means for coupling the same at one end to the bearing of the outer tubular body and adapted to be connected at the other end to the stationary portion of a vehicle.

In testimony whereof I affix my signature in presence of two witnesses.

JOHN G. JOHNSON. [L. S.]

Witnesses:
J. C. NORTON,
J. A. WHEELER.